United States Patent [19]

Asayama

[11] Patent Number: 5,168,355
[45] Date of Patent: Dec. 1, 1992

[54] APPARATUS FOR DETECTING DISTANCE BETWEEN CARS

[75] Inventor: Yoshiaki Asayama, Hyogo, Japan
[73] Assignee: Mitsubishi Denki K.K., Tokyo, Japan
[21] Appl. No.: 738,649
[22] Filed: Jul. 31, 1991
[30] Foreign Application Priority Data
 Sep. 4, 1990 [JP] Japan .................. 2-234683
[51] Int. Cl.⁵ .......................... H04N 7/00; H04N 7/18
[52] U.S. Cl. .................... 358/105; 358/103; 358/126
[58] Field of Search ............... 358/105, 125, 126, 103; 356/385

[56] References Cited

U.S. PATENT DOCUMENTS

| | | | |
|---|---|---|---|
| 4,333,106 | 6/1982 | Lowe | 358/125 |
| 4,644,397 | 2/1987 | Roy et al. | 358/126 |
| 4,959,714 | 9/1990 | Lo et al. | 358/125 |
| 5,005,083 | 4/1991 | Grage et al. | 358/105 |
| 5,023,712 | 6/1991 | Kajiwara | 358/105 |
| 5,077,609 | 12/1991 | Manelphe | 358/103 |

FOREIGN PATENT DOCUMENTS

| | | |
|---|---|---|
| 60-33352 | 8/1985 | Japan . |
| 63-38085 | 7/1988 | Japan . |
| 63-46363 | 9/1988 | Japan . |
| 1-35305 | 7/1989 | Japan . |

Primary Examiner—John K. Peng
Attorney, Agent, or Firm—Sughrue, Mion, Zinn, Macpeak & Seas

[57] ABSTRACT

An apparatus is provided for detecting a distance between cars, which apparatus is capable of continuously measuring the distance between one's own car and a preceding car even if the preceding car is moving as far as possible within the visual field of the apparatus. The apparatus is also capable of distinguishing which one of a plurality of preceding cars is being measured for distance, and of simultaneously measuring the distance to another car traveling in parallel to one of the preceding cars.

4 Claims, 5 Drawing Sheets

APPARATUS FOR DETECTING DISTANCE BETWEEN CARS

BACKGROUND OF THE INVENTION

The present invention relates to an apparatus for optically and continuously detecting the distance between a preceding car and one's own car by image sensors.

Japanese Examined Patent Publication Nos. Sho-63-38085 (1988) and Sho-63-46363 (1988) disclose image sensors for optically detecting the distance between cars going in the same direction.

In these Japanese Publications, it is proposed to employ a pair of left- and right-hand optical systems as shown in FIG. 6, these left- and right-hand optical systems having respective lenses 1 and 2 that are separated by a base length of L.

Discrete image sensors 3 and 4 are provided at the respective positions of focal length f of the lenses 1 and 2, respectively, and a signal processor 30 is provided for sequentially shifting the picture signals supplied from the image sensors 3 and 4 for electrical superposition. A distance R up to an object 31 is obtained from a shift quantity l taken when the two picture signals are synchronized by triangulation, wherein:

$$R = \frac{f \cdot L}{l}.$$

Japanese Examined Patent Publication No. Sho-60-33352 (1985) discloses a technique of tracking the preceding car image picked up by image sensors or the like.

Wherein a target is tracked by an operator who sets a tracking gate (window) encompassing the target on a display screen while watching the display screen.

The conventional apparatus for detecting the distance between cars, as described above, measure only the distance to the object in the direction of an optical axis of the apparatus.

Thus, to measure the distance to a moving object with the conventional apparatus mounted on one's own car, for instance, the optical axis of the apparatus must be adjusted to direction of the moving object.

As the distance to the object is measured by comparing the images picked up by the pair of left-hand and right-hand optical systems, a problem results in that, when it is attempted to measure the distance to the preceding car, if another car is going on the left or right of the preceding car in parallel, thereto the driver will be unable to perceive which one of the cars is being used for the measurement of the distance thereto.

SUMMARY OF THE INVENTION

An object of the present invention is to solve the foregoing problems by providing an apparatus for detecting the distance between cars which apparatus is capable of continuously measuring the distance to an object once the object is determined, even if the object is moving as far as possible within the visual field of the apparatus. The apparatus must also distinguish which one of the preceding cars is the object intended for the measurement of the distance thereto even if there exists a plurality of cars traveling ahead. Finally, the apparatus must be capable of simultaneously measuring the distance to another car traveling in parallel to the preceding car.

An apparatus, according to the present invention, for detecting the distance between cars, comprises two image sensors capable of imaging a wide visual field covering a preceding car, the sensors being arranged apart in the vertical direction, a display means for displaying the preceding car image picked up by either upper or lower image sensors, an image tracking device for tracking the preceding car image using a first window encompassing the preceding car image, and a distance computing means for computing the distance to an object encompassed by a second window set adjacent to the first window.

The image sensors according to the present invention are used for imaging a preceding car in a wide visual field such that the preceding car image picked up by the upper and lower image sensors is displayed on the display means. The distance computing means is operated so as to encompass the preceding car image in the first window and then the image tracking means is employed for tracking the preceding car image to detect the shifting of the upper picture signal from the corresponding lower one, with the picture signal in the first window as a reference signal. The distance between one's own car and the preceding car is then computed. The shifting of the upper picture signal from the corresponding lower one is detected, simultaneously with the picture signal in the second window as a reference signal whereby the distance to the object encompassed by the second window is computed.

BRIEF DESCRIPTION OF THE DRAWINGS

FIG. 1 is a block diagram illustrating wherein an apparatus for detecting the distance between cars is shown an;

DESCRIPTION OF THE PREFERRED EMBODIMENT

Figure 1:
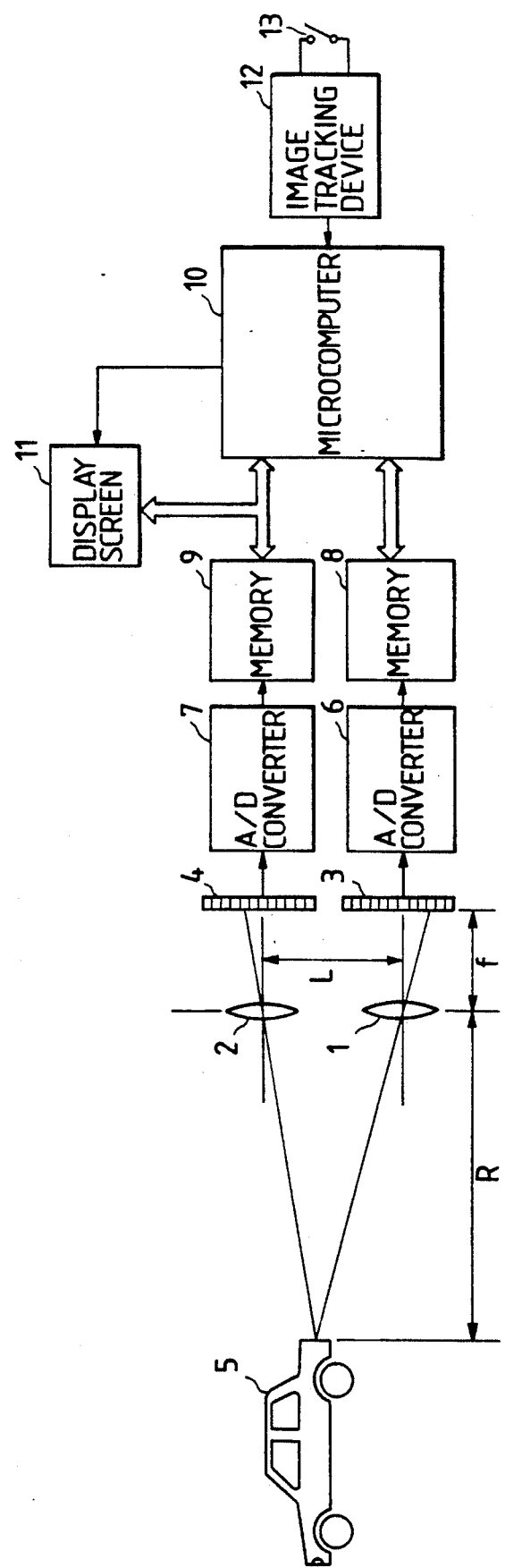
Figure 6:
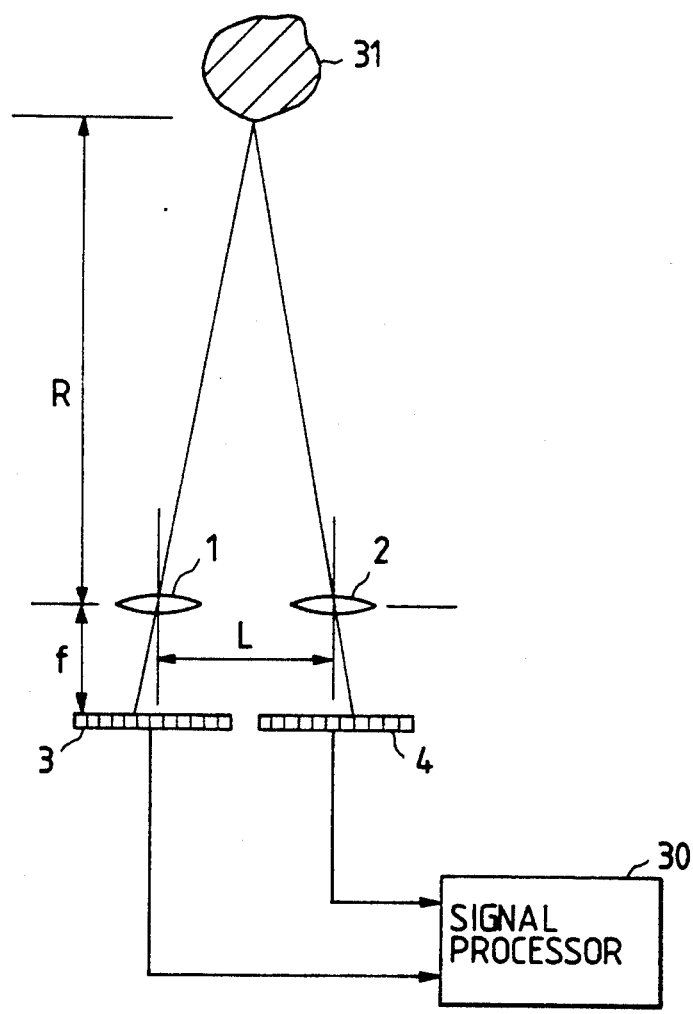
FIG. 6 is a block diagram illustrating a conventional apparatus for detecting the distance between cars.

A description will now be given with reference to the accompanying drawings of an embodiment of an apparatus for detecting the distance between cars. FIG. 1 is a block diagram illustrating the constitution of an embodiment. In FIGS. 1 and 6, like reference characters designate like elements.

As shown in FIG. 1, lenses 1 and 2, which are arranged apart by a base length of L, form an upper and a lower optical system with two dimensional image sensors 3 and 4 corresponding, respectively, with lenses 1 and 2, the image sensors 3 and 4 being provided, respectively, at the focal length f of the lenses 1 and 2.

Numerals 6 and 7 represent analog/digital converters (hereinafter, A/D) for digitalizing the picture signals picked up by the image sensors 3 and 4, respectively.

The outputs of the A/D converters 6 and 7 are stored in respective memories 8 and 9, the writing and reading of data to and from the memories 8 and 9 being controlled by a microcomputer 10 as a distance computing means.

The image picked up by the image sensor 4 is displayed on a display screen 11 with respect to the data read from the memory 9. The display screen 11 is used as a display means and is controlled by the microcomputer 10.

Figure 3:
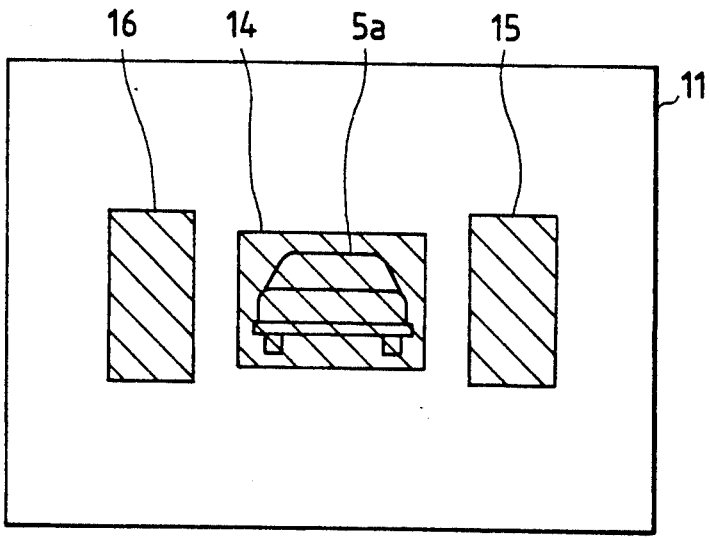
FIG. 3 is a diagram illustrating a state wherein the preceding car image has completely entered the first window in the embodiment of FIG. 1.

Numeral 12 designates an image tracking device. As shown in FIG. 3, the image tracking device 12 forms a first window 14 on the display screen 11 for use in tracking a preceding car image 5a and a second and third window 15 and 16 adjacent to the first window 14. The tracking device 12, operates to track the preceding car image 5a encompassed within the first window 14.

An image tracking instruction switch 13 in FIG. 1 is operated by the driver.

Figure 2:
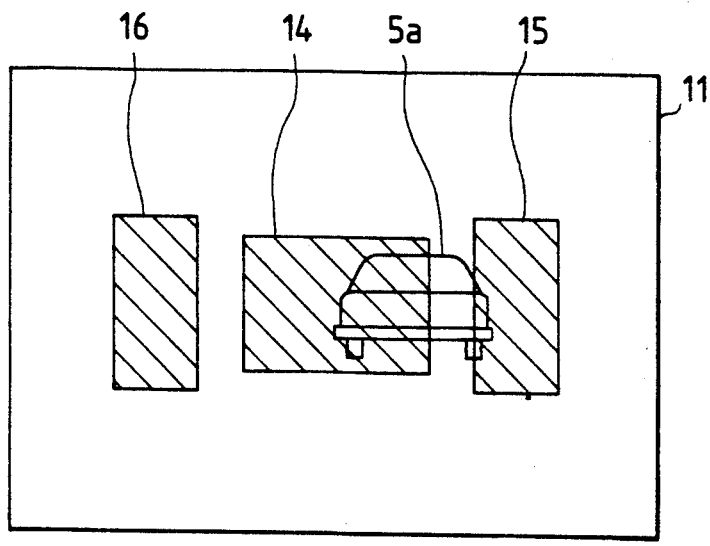
FIG. 2 is a diagram illustrating a state wherein a preceding car image is entering the display screen in the embodiment of FIG. 1.

The operation of the apparatus will now be described. Assuming the preceding car image 5a, which should follow the image picked up by the upper image sensor 4, enters the display screen 11 where the first, the second and the third windows 14, 15, 16 are set, and is displayed thereon as shown in FIG. 2, the driver steers his car so as to move the preceding car image 5a completely within the first window 14 by changing the relative position of his car to the preceding car 5.

If the driver turns on the image tracking instruction switch 13 when the preceding car image 5a is completely within the first window, as shown in FIG. 3, the first window 14 will track the movement of the preceding car image 5a wherever the car 5 moves. The function of tracking the preceding car image 5a is thus performed automatically by the first window 14.

As the first window 14 is moved to perform the image tracking function, the second window 15 and the third window 16 are also moved simultaneously.

The image tracking function described above is similar to those performed by the conventional apparatus as disclosed in Japanese Examined Patent Publication Nos. Sho-60-33352 (1985) and Hei-1-35305 (1989). Accordingly, a detailed description thereof is omitted.

A description is now given of a method of detecting the distance between one's own car and the a preceding car. First, the microcomputer 10 reads, from the memory 9, a pixel signal in the first window 14 tracking the preceding car image 5a to make this signal a reference signal for computing the distance between cars. The microcomputer 10 then selects an area corresponding to the first window 14 from the memory 8 in which the picture signal derived from the lower image sensor 3 has been stored and, while sequentially shifting the picture signal in the memory 8 pixel by pixel with respect to the reference signal, computes, step by step, the total absolute value of such differences between the upper and the lower pixels.

Figure 4A:
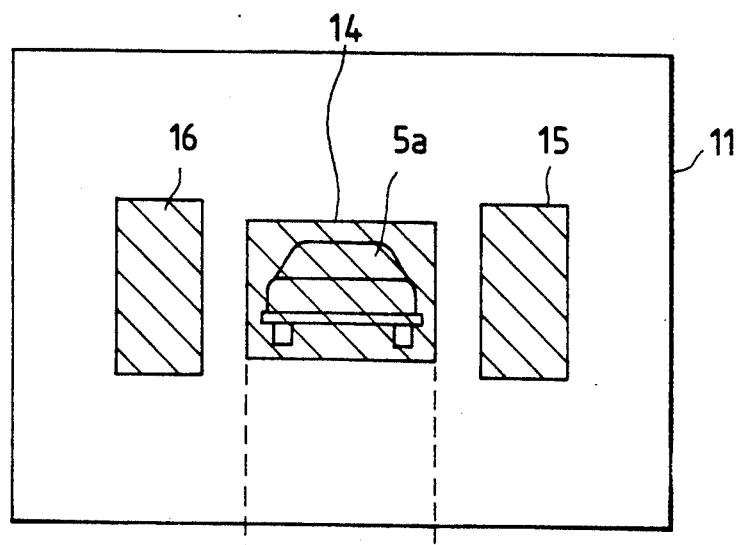
FIGS. 4A and 4B are diagrams illustrating a picture area in another memory corresponding to a reference picture signal in the first window in the embodiment of FIG. 1.
Figure 4B:
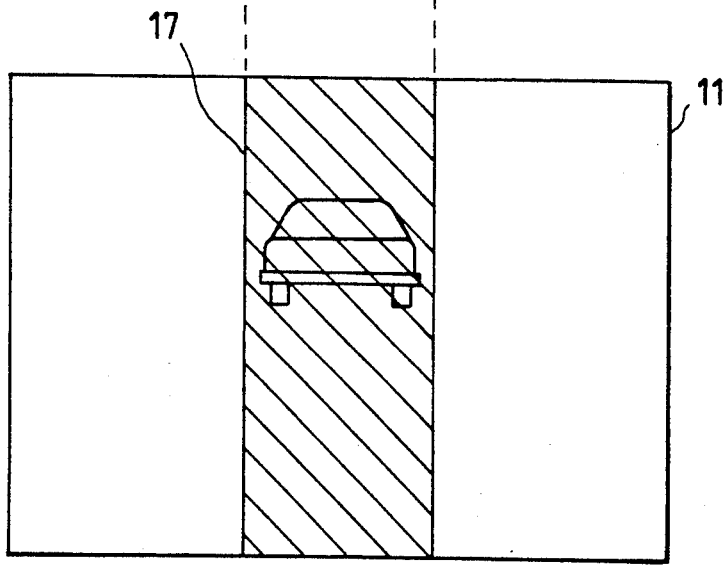

In other words the position of an image best matching the image in the first window 14 is obtained by shifting one pixel at a time. The area selected with resect to the reference signal in the first window 14, as shown in FIG. 4A, is an area 17 corresponding to the position of the first window 14 with respect to the image of the memory 8 shown in FIG. 4B.

As set forth above, given n pixels as the shift amount when the total absolute value of the difference in signals obtained by comparing the upper and the lower pixels a becomes minimum, and given p as the pixel pitch, L as the base length of the optical systems, f as the focal length of the lenses 1 and 2, and R as the distance to a preceding car 5, R is obtained from the following equation (1):

$$R = \frac{f \cdot L}{np} \qquad (1)$$

Thus, although the preceding car 5 may move to the left or right, it is tracked so that the distance between one's own car and the tracked car may be obtained without interruption.

Figure 5A:
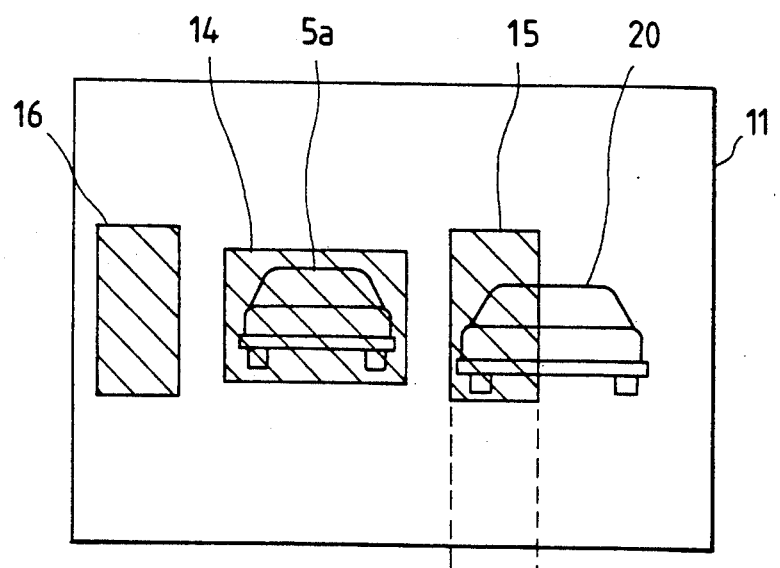
FIGS. 5A and 5B are diagrams illustrating the picture area to be compared with a picture in the second window in the embodiment of FIG. 1.

When another preceding car 20 is caught in the second window 15 as that car 20 enters the visual fields of the image sensors 3 and 4, as shown in FIG. 5A, the microprocessor 10 selects an operation area 18 (FIG. 5B) of the picture in the memory 8, the operation area 18 corresponding to that area in the second window 15 in the memory 9, the picture signal in the second window 15 being a reference signal, and then obtains the position of an image best matching the image in the second window 15 in the operation area 18, and computes the distance between the additional preceding car and one's own car.

In this way, the distance to each preceding car can be detected even when a plurality of preceding cars are detected.

Figure 5B:
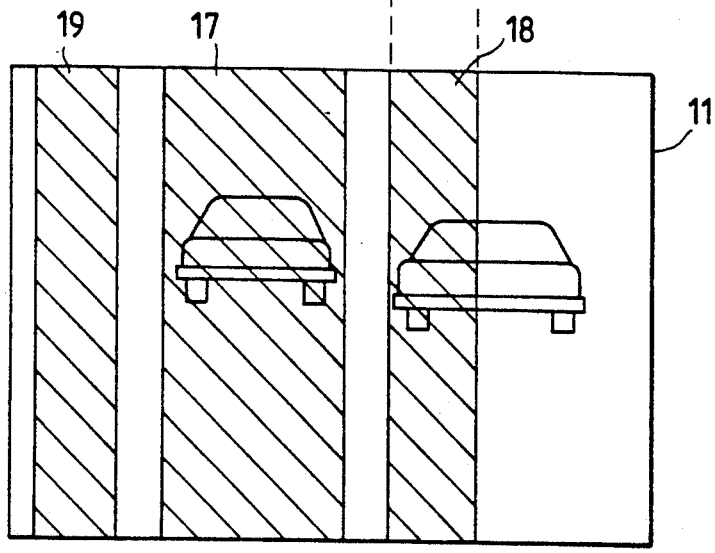

The objects caught in the respective second and third windows 15, 16 adjacent to the first window 14 for tracking the picture of the preceding car 5 are, as shown in FIG. 5B, subjected to picture comparisons in the operation areas 18 and 19, respectively, corresponding to the second and third windows 15 and 16. The distance to these objects can therefore be measured using windows, as described above.

Although two windows 15 and 16 are shown adjacent to the first window 14. The number of windows may be increased as, for example, when it is desired to maintain close observation of a wide visual field ahead of one's own car.

Moreover, the size and shape of the window may be varied optionally in accordance with an object and are not limited to those defined in the embodiment shown.

As set forth above, according to the present invention, the preceding car image is picked up by the image sensors including a pair of optical systems vertically arranged. The image is then displayed on the display means while a picture tracking device tracks the preceding car image in the first window. The second window is set adjacent to the first window and, with the picture signals as reference signals, the shifting of the upper picture signal from the corresponding lower one is detected so as to compute the distance between one's own car and the preceding car. When a plurality of cars are traveling ahead, a target preceding car is distinguished from the remaining ones and the distance to each of them is detected.

Also, as the target preceding car image is always displayed, the driver is allowed to properly monitor which one of the preceding cars is being tracked while detecting the distance between the driver's car and the tracked car.

What is claimed is:

1. An apparatus for detecting a distance between one's own car and a preceding car, comprising:

a pair of first and second image sensors for outputting image signals of a preceding car image, said preceding car image being formed on said first and second image sensors by a pair of vertically arranged first and second optical systems;

display means for displaying said preceding car image outputted by said first image sensor;

an image tracking device for tracking said preceding car image in a first window to be displayed on said display means; and distance computing means for detecting a displacement between the image signals displayed in said first window and another set of image signals outputted by said second image sensor so as to compute the distance between said one's own car and said preceding car, and likewise for detecting a displacement between image signals of a different object which is displayed in a second window adjacent to said first window, and another corresponding set of image signals outputted by said second image sensor to compute a distance to the different object displayed in the second window.

2. An apparatus as claimed in claim 1, further comprising:

a pair of first and second analog-to-digital converters for digitalizing the image signals outputted by said image sensors; and a pair of first and second memories for storing outputs of said converters, said distance computing means controlling steps of writing to and reading from said first and second memories.

3. An apparatus as claimed in claim 1, wherein said distance between one's own car and a preceding car is obtained from the following equation;

$$R = \frac{f \cdot L}{d}$$

wherein R represents said distance, f represents a focal length of said optical systems, L represents a base length between said optical systems, and d represents the displacement.

4. An apparatus as claimed in claim 1, wherein said second window comprises a plurality of windows.

* * * * *